United States Patent [19]
Uber

[11] Patent Number: 6,051,990
[45] Date of Patent: Apr. 18, 2000

[54] ASYMMETRIC CURRENT MODE DRIVER FOR DIFFERENTIAL TRANSMISSION LINES

[75] Inventor: Richard Uber, North Grafton, Mass.

[73] Assignee: Quantum Corporation, Milpitas, Calif.

[21] Appl. No.: 08/969,375

[22] Filed: Nov. 13, 1997

[51] Int. Cl.[7] .......................... H03K 17/16; H03K 19/003
[52] U.S. Cl. ................................ 326/33; 326/82; 326/86; 326/90; 326/30
[58] Field of Search .................................. 326/33, 30, 82, 326/83, 86, 90, 56

[56] References Cited

U.S. PATENT DOCUMENTS

| | | | |
|---|---|---|---|
| 5,285,477 | 2/1994 | Leonowich | 375/257 |
| 5,297,067 | 3/1994 | Blackborrow et al. | 364/708.1 |
| 5,301,329 | 4/1994 | Frame et al. | 364/725 |
| 5,418,478 | 5/1995 | Van Brunt et al. | 326/86 |
| 5,497,113 | 3/1996 | Uber | 327/170 |
| 5,519,728 | 5/1996 | Kuo | 375/257 |
| 5,525,914 | 6/1996 | Cao et al. | 326/71 |
| 5,592,510 | 1/1997 | Van Brunt et al. | 326/86 |

OTHER PUBLICATIONS

Peter Ridge, *The Book of SCSI: A Guide for Adventurers*, No Starch Press, Daly City, CA © 1995, pp. 21–23, "Terminating the SCSI Bus."

*Primary Examiner*—Michael Tokar
*Assistant Examiner*—Daniel D. Chang
*Attorney, Agent, or Firm*—David B. Harrison

[57] ABSTRACT

A driver circuit drives a digital signal onto a differential digital data transmission bus nominally biased to a negative data state during bus idle intervals by a weak negation bias current. The driver circuit overcomes the negation bias current during an active signaling sequence and comprises a signal current source and sink pair for selectively sourcing and sinking current onto positive and negative lines of the transmission bus in accordance with internally-supplied binary data levels during the active signaling sequence, and a bias override current source and sink pair for applying an override bias current to the positive and negative lines of the transmission line without interruption during the signaling sequence.

11 Claims, 4 Drawing Sheets

ASYMMETRIC CURRENT MODE DRIVER FOR DIFFERENTIAL TRANSMISSION LINES

FIELD OF THE INVENTION

The present invention relates to the field of digital data transmission lines and related driver circuits. More particularly, the present invention is related to method and apparatus for providing asymmetric current drive for a digital differential signal transmission line.

BACKGROUND OF THE INVENTION

Buses are used to interconnect components and elements of digital computing systems. A bus is a collection of wires in a cable or conductive traces on a printed circuit board which transmit data, status, and control signals, and supply operating power and ground return paths. A bus between physically separate computing systems is frequently referred to as a network.

Standard buses and bus structures have become widespread in digital computing. One family of bus structures is known as Small Computer System Interface, or "SCSI". The SCSI bus structure has become standardized, as specified by document S3.131-1986 published by the American National Standards Institute in June, 1986. This bus enabled eight computer CPUs and peripherals to be interconnected, and provided a defined physical interconnect and a signaling construct enabling exchange of data between interconnecting computing/storage subsystems, etc.

One recent improvement to SCSI has been the low voltage differential bus structure. This bus structure includes a pair of signal paths or wires for each logical signal, and each path has a signaling range of only approximately 400 millivolts, e.g. 1.1 volts to 1.5 volts. Two differential signal lines can hold two binary states. The voltages (1.5 v, 1.1 v) represent one state while the voltages (1.1 v, 1.5 v) represent the opposite binary state. While the voltages in this example are not absolute, it is a characteristic of such systems that the voltage difference between the two lines (0.4 v) is much smaller than the average voltage on the two lines (e.g. 1.3 v). This very narrow signaling range presents certain unique design requirements and challenges for interface circuits supporting connection to this bus structure. Most existing SCSI systems use a single bus path for signaling instead of differential signal pairs. In such a "single-ended" system, a voltage of greater than e.g. 1.9 v represents one binary logic state while a voltage level of less than 1.1 volt represents the other binary logic state.

A multi-user (multi-drop) communication bus, such as low voltage differential SCSI, requires a mechanism for determining that the bus is idle. That is to say, a signal condition must be present indicating to all attached users that the bus is idle and not being driven by a user at a particular moment. For some commonly used buses, this mechanism is implemented by providing a weak bias or voltage offset on the bus during idle. When all of the users or drops are at a high impedance, this bias condition enables the idle bus to have a known state, known as "negated state", and the bias is known as a "negation bias".

One drawback from use of a weak bias is that the bus winds up with asymmetric drive requirements. To reverse the state of the bus, a drive signal must have a strength great enough to overcome the negation bias as well as drive a reliable signal down the transmission line. To switch back to negation requires a weaker signal, since the negation bias now aids the signal rather than opposing it.

Prior approaches have included a current source and sink driver pair for signaling (FIG. 4A, I1/I3). One common mode component resulting from tolerances present in the signal source/sink driver pair I1/I3 is a differential offset voltage which is graphed in FIG. 2, graphs A and B. An additional bias current negation source/sink pair (FIG. 4A, I2/I4) was also provided. This pair was selectively enabled specifically to counteract the bias current. While the bias current negation source and sink pair are designed to be closely matched, in practice, tolerances are present and switching the pair on and off results in a common mode ripple (time varying) component.

In addition, an on-off manner of operation of the bias current negation source/sink pair in accordance with the prior art resulted in a time varying, common mode voltage component (FIG. 2, graph C). The drawback of the prior approach becomes more clearly understood and appreciated by referring to the graphs of FIG. 3. FIG. 3 graph A shows a signaling sequence which begins with a bus idle condition, followed by a bus acquisition interval, followed by high speed data, followed by a bus release interval, and finally a return to bus idle.

With reference to FIG. 4A, the conditions for symmetrical bus drive voltages are:

assertion voltage=negation voltage, or $(I1+Ierr1+I2+Ierr2)Z/2-Vbias=(I1+Ierr1)Z/2+Vbias$, where $Ierr1=(I3-I1)/2$ $Ierr2=(I4-I2)/2$.

Simplifying, $(I2+Ierr2)Z/2=2\ Vbias$.

The nominal setting for I2 is $I2=2Vbias/(Z/2)$, so the error term Ierr2 (mismatch of I2, I4) determines the assertion/negation mismatch of the bus signal. The error term creates a significant problem because it is only present when I2 and I4 are being driven (during data assertions in the prior art, for example). Thus, when I2 and I4 are driven during high speed data, a time varying common mode error signal is added onto the bus. This error signal is further explained by reference to the following table 1 which explains operation of the FIG. 4A circuit in light of the FIG. 3 signal sequence:

TABLE 1

|  | Float Negation | Active Negation | As-As-sert | Ne-Ne-gate | Assert | Active Active Negation | Float Float Negation |
| --- | --- | --- | --- | --- | --- | --- | --- |
| I1/I3 | 0ma | +4ma | −4ma | −4ma | +4ma | −4ma | 0ma |
| I2/I4 | 0ma | 0ma | +4ma | 0ma | +4ma | 0ma | 0ma |
| Term | −2ma | −2ma | −2ma | −2ma | −2ma | −2ma | −2ma |
| bus: | −2ma | −6ma | +6ma | −6ma | +6ma | −6ma | −2ma |

To summarize the operation of the FIG. 4A driver, during a float operation, all switches are open. During a negate condition, switches S1N and S3N are closed. During an assert condition, switches S1A, S3A, S2 and S4 are closed, and currents I2 and I4 are twice the negation bias current. While the bus appears to be balanced, the bias current negation I2/I4 source-sink driver effectively injects a time varying common mode voltage shown in FIG. 3 graph C. This voltage is particularly objectionable during high speed data transfer, because it is not canceled by the terminations at the end of the bus and results in reflections and standing waves which may interfere with the integrity of the high speed data, particularly in the case of low voltage differential high speed data over e.g. a SCSI bus structure.

SUMMARY OF THE INVENTION

A general object of the present invention is to provide an asymmetric current mode driver for a differential transmission line which eliminates common mode signal disturbances during high speed data transfer bursts in a manner overcoming limitations and drawbacks of prior approaches.

Another object of the present invention is to provide a method for operating a bias current negation source/sink driver pair in a manner eliminating ripple during high speed data transfers over a differential signal bus.

A further object of the present invention is to eliminate time varying current mode ripple components from a driver connected to a differential transmission line in a manner enabling compatibility with other drivers present on the transmission line, thereby providing backwards compatibility of the driver with existing bus structures and users.

In one aspect of the present invention a method is provided for operating a bus driver during a signaling sequence. During the sequence the bus driver is connected to positive and negative lines of a differential digital data transmission bus having a weak negation bias which is applied throughout the signaling sequence. The signaling sequence includes a bus idle phase, a bus acquisition phase, a high speed data transmission phase, a bus release phase and a bus idle phase. The method includes the steps of applying a hard negation current to the bus via a signal current source and sink pair during the acquisition phase and during the release phase, and applying differential switched assert and negate currents during the high speed data transmission phase, and switching on a bias override current source and sink pair to apply an override bias current to the positive and negative lines of the transmission line beginning during the acquisition phase and continuing without interruption to the bus release phase, whereby common mode current ripple otherwise occurring during the high speed data transmission phase is eliminated.

In another aspect of the present invention a driver circuit is provided for driving a digital signal onto a differential digital data transmission bus having a weak negation bias current for nominally biasing the bus to a negative data state during bus idle intervals. The driver circuit overcomes the negation bias current during an active signaling sequence and comprises a signal current source and sink pair for selectively sourcing and sinking current onto positive and negative lines of the transmission bus in accordance with internally-supplied binary data levels during the active signaling sequence, and a bias override current source and sink pair for applying an override bias current without interruption to the positive and negative lines of the transmission line during the signaling sequence.

In this aspect of the invention the bias override current source and sink pair flow an override current approximately opposite and equal to the weak negation bias current, and the signal current source and sink pair flow substantially all of the signal current applied to the bus during the signaling sequence. In one example the weak negation bias current is approximately two milliamperes, the bias override current is approximately two milliamperes flowing oppositely to the weak negation bias, and the signal current source and sink pair flow signal currents in a range of from approximately seven to eight milliamperes. The signaling sequence preferably includes a bus idle phase, followed by a bus acquisition phase, followed by a high speed data transfer phase, followed by a bus release phase, followed by a bus idle phase; and, the bus override current source and sink pair apply the override bias current without interruption from the bus acquisition phase to the bus release phase.

These and other objects, aspects, advantages and features of the present invention will become more completely understood and appreciated by considering the following detailed description of a preferred embodiment which is presented in conjunction with the accompanying drawings.

DETAILED DESCRIPTION OF A PREFERRED EMBODIMENT

Figure 1:
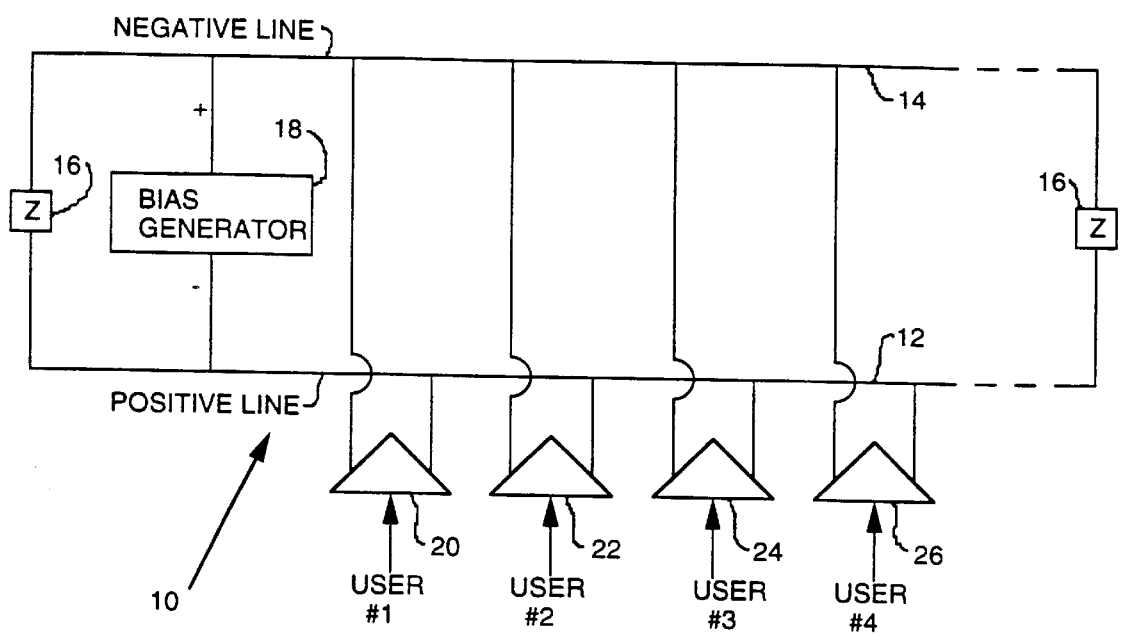
FIG. 1 is a block diagram of a conventional multi-drop differential communication bus having a weak bias generator for biasing the bus during idle.

FIG. 1 shows a conventional digital differential bus structure 10 which implements a bus standard or convention, such as low voltage differential SCSI, for example. The bus 10 includes a positive line 12 and a negative line 14. When the positive line 12 is driven high or true (and the negative line 14 is driven low or false) a digital value is being asserted. On the other hand, when the positive line 12 is driven low or false (and the negative line 14 is driven high or true), the digital signaling condition is negated. The bus 10 is terminated at each end by a terminator 16 which matches the characteristic impedance of the bus. A bias generator 18 applies a weak negation bias to the differential bus 10, such as e.g. −2.1 milliamperes.

Figure 2:
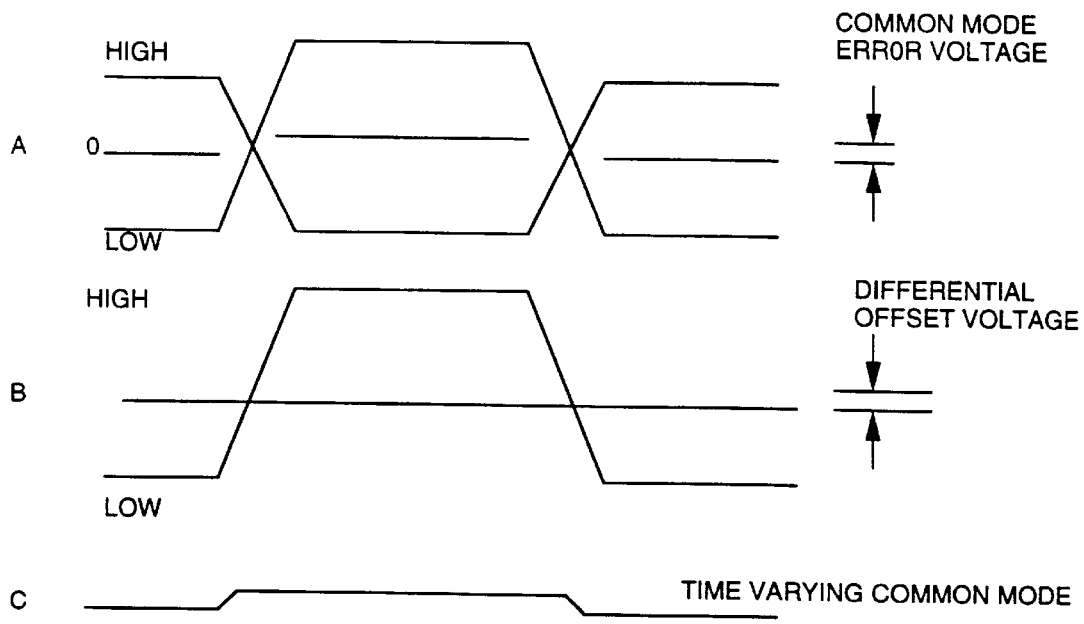
FIG. 2 is a series of waveform graphs showing conventional operation of the FIG. 1 bus structure. Graph A shows a transmitted differential waveform having a common mode error voltage component. Graph B shows the differential component of the Graph A waveform showing a differential voltage offset. Graph C shows a time varying common mode component of the Graph A waveform.
Figure 3:
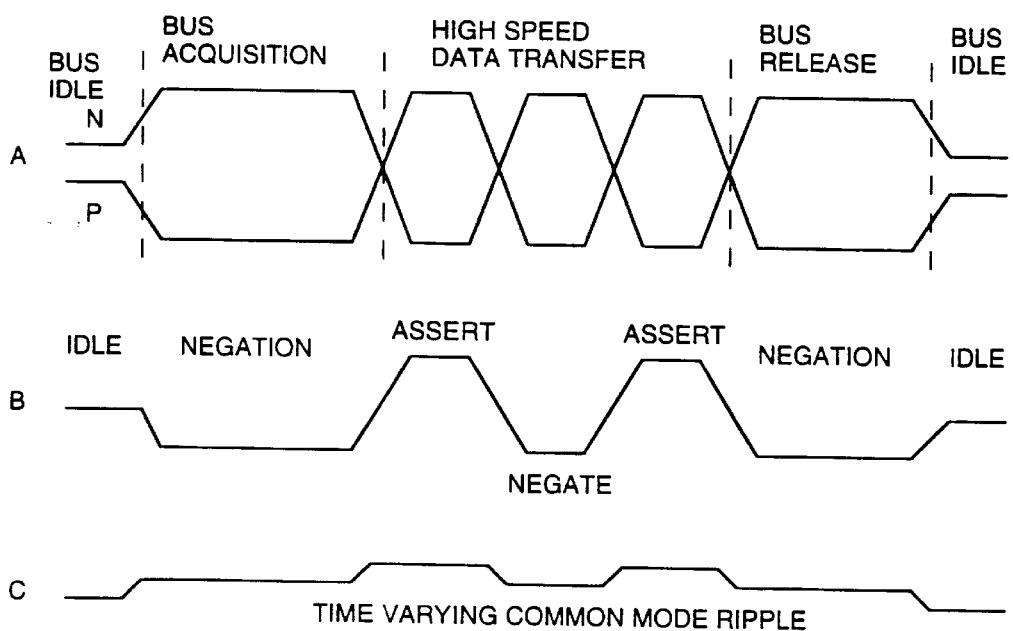
FIG. 3 is a series of waveform graphs showing a high speed data transfer signaling sequence over the FIG. 1 bus structure. Graph A shows a transmitted differential waveform having idle bus, bus acquisition, high speed data, bus release and idle bus signal sequences. Graph B shows the differential voltage components of the Graph A waveform. Graph C shows the common mode voltage component of the Graph A waveform.

A number of users (drops) may be connected to the bus 10. Four users 1, 2, 3 and 4 are shown connected to bus 10 in FIG. 1, although a greater number or lesser number of users may be attached (the minimum number of users being two). These users include output drivers 20, 22, 24 and 26. The drivers 20, 22, 24 and 26 are typically included in very large scale integrated circuit (VLSI) bus interface chips, and are therefore subject to manufacturing tolerances. Also, those skilled in the art will appreciate that FIG. 1 omits any receivers which would be connected to receive data from the bus, as the present invention relates to drivers. In practice, receivers would be present in each user interface circuit chip. If the drivers 20, 22, 24 and 26 are conventionally operated in accordance with FIGS. 2 and 3, they result in a time-varying common mode voltage during high speed data transfer as shown in Graph C of FIG. 3.

Figure 4A:
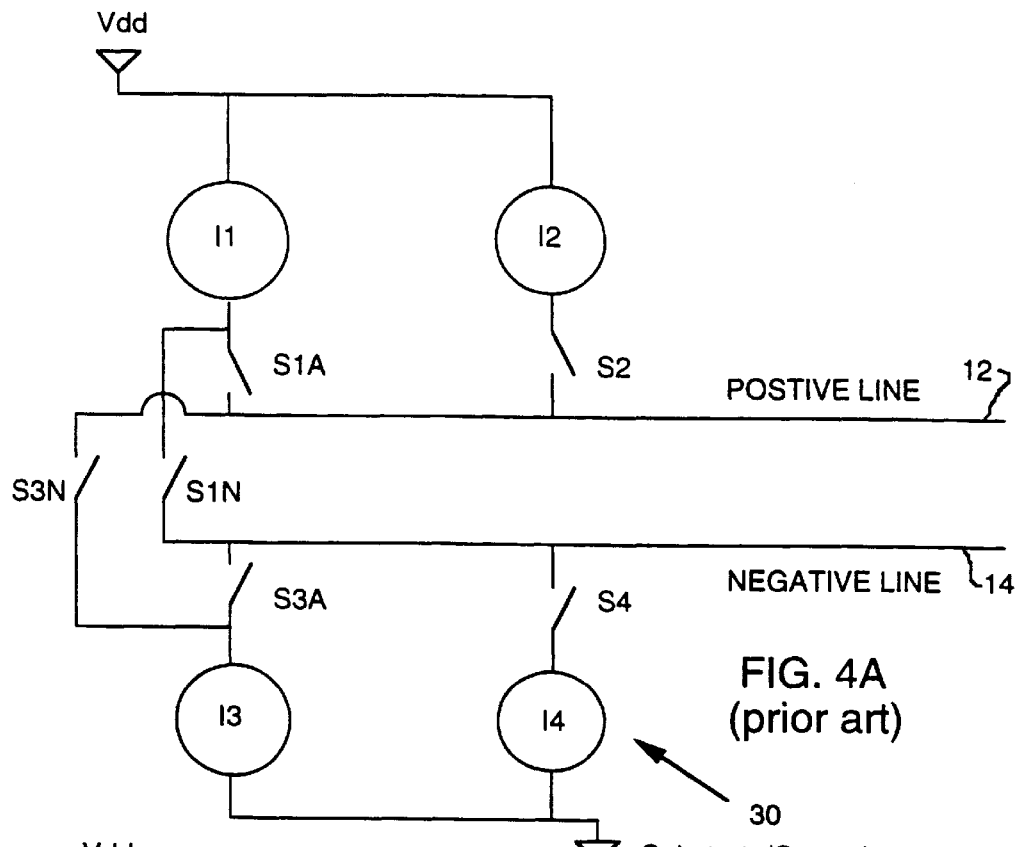
FIG. 4A is a block diagram of an asymmetric current mode driver operating in accordance with conventional principles.
Figure 4B:
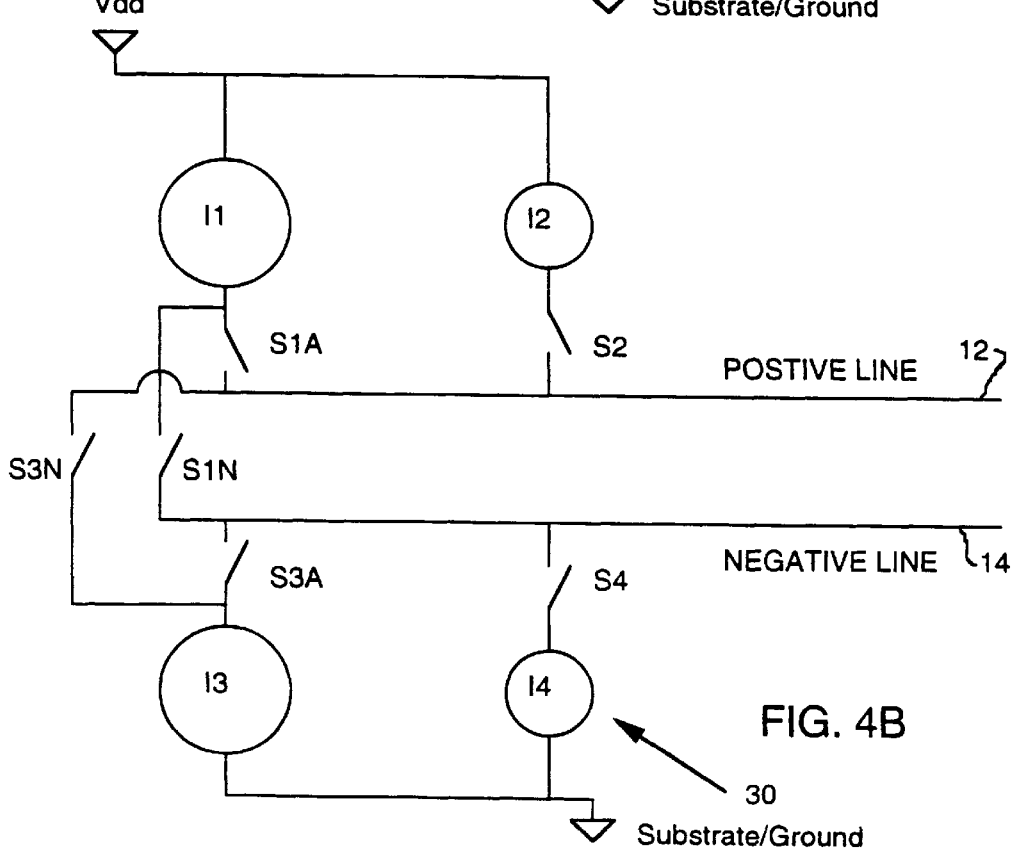
FIG. 4B is a block diagram of an asymmetric current mode driver operating in accordance with principles of the present invention.
Figure 5:
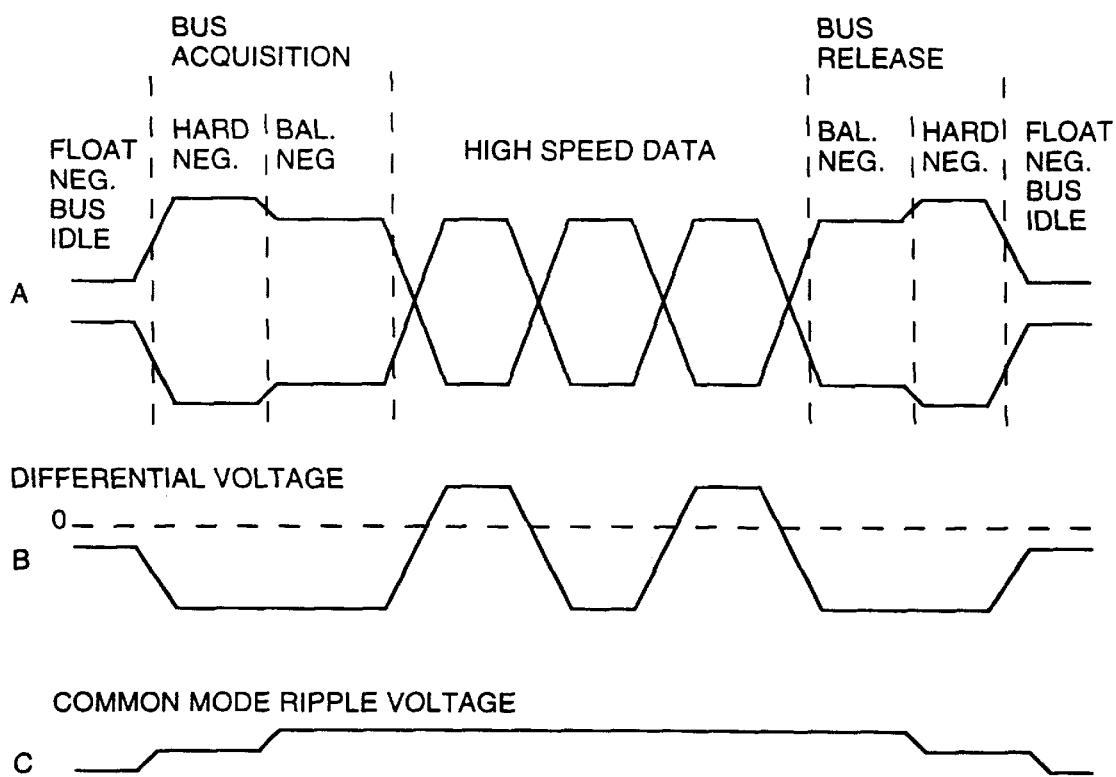
FIG. 5 is a series of waveform graphs showing a high speed data transfer signaling sequence of the FIG. 4B driver over the FIG. 1 bus structure. Graph A shows a differential waveform having idle bus, hard bus bias negation, balanced bus bias negation, high speed data (assert, negate, assert), bus release (balanced negation, hard negation) and idle bus intervals. Graph B shows the differential voltage components of the Graph A waveform. Graph C shows the resultant non-zero common mode voltage component which remains flat during high speed data signaling in accordance with principles of the present invention.

However, if these drivers 20–26 are implemented and operated in accordance with the FIGS. 4B–5 implementation, any time-varying common mode voltage distortion will occur only during initial bus acquisition, and the distortion is not present during high speed data transmission. In essence, a driver 30A shown in FIG. 4B includes a termination bias cancellation source/sink pair I2/I4 which will put out e.g. approximately 2.1 milliamperes of current which will cancel the approximate −2.1 milliamperes bias seen on the bus 10 at the bus terminator 16. While there will be manufacturing tolerances in both the source I2 and sink I4 circuits, and those tolerances will result in a common mode error Ierr, the error won't matter if the common mode voltage step from these tolerances occurs at a time when the bus 10 is being acquired and well before actual high speed data transfer occurs.

Referring to FIG. 4B, a driver circuit 30A in accordance with the present invention includes two current source/sink pairs: a main signaling source I1 connected to source current from a positive supply bus Vdd, and a main signaling sink I3 connected to sink current to a substrate or ground current return. The source I1 and sink I3 are selectively connected to the positive and negative lines 12 and 14 of the bus 10 via switches S1A, S1N, S3A and S3N. When switches S1A and S3A are closed (and the switches S1N and S3N are open), the source I1 and sink I3 respectively assert a data true condition onto the bus 10. When the switches S1N and S3N are closed (and the switches S1A and S3A are open), the source I1 and sink I3 respectively assert a negative data (false) condition onto the bus 10. Of course, the switches S1A, S3A, S1N and S3N operate in accordance with a logical signal provided by the user circuit including the driver 30A.

The bias generator 18 places a weak negative bias onto the bus 10 when no driver is active (bus is idle). Accordingly, in the example of low voltage differential SCSI, the bias generator 18 causes a minus two milliamperes (−2 ma) current flow. The current source/sink pair I2/I4 is provided in the FIG. 4 circuit to negate the negative current being applied to the bus 10 by the bias generator 18. Unlike prior approaches, in accordance with the new method, source I2 and sink I4 are switched only twice during each signaling sequence, once during bus acquisition phase, and once during bus release phase.

Currents flowing through driver source/sink pair I1/I3 are intended by design to match, while currents flowing through bias negation source/sink pair I2/I4 are also intended by design to match.

Also, in the circuit 30A of FIG. 4B, the driver source I1 and sink I3 are made larger than heretofore, and the bias negation source I2 and sink I4 are made smaller than heretofore. Ideally, the driver source and sink I1/I3 each carry about 7–8 ma (instead of 4 ma as described above in connection with FIGS. 2 and 3) whereas the bias negation source and sink I2/I4 carry about 2.1 ma (instead of 4 ma as described above). It does not matter that one of the I1/I3 pair flows only 7 ma, and the other flows 7.2 ma because the common mode offset (shown in shown in FIG. 5, graph B remains constant throughout the data transfer sequence. This constant offset is not a problem so long as it keeps the signals within the signaling bandwidth of the bus. The bus can tolerate a common mode movement, but it has trouble with ripple and transients. As explained, the ripple causes reflections and other disturbances on the bus 10 which can result in false data detection, etc.

The balance equations for the FIG. 4B circuit in accordance with principles of the present invention are as follows:

$$(I1+Ierr1+I2+Ierr2)Z/2-Vbias=(I1+Ierr1-I2-Ierr2)Z/2+Vbias$$

Simplifying:

$$2(I2 \ *Ierr2)Z/2=2Vbias, \text{ and}$$

$$I2+Ierr2=2Vbias/Z$$

The design nominal is for I2 to equal 2VBias/Z, which leaves Ierr2 (i.e. the mismatch between I2 and I4) as a constant error term (one not varying with bus logical state. In accordance with the present invention the error term is established when transmission starts, and remains constant until the transmission is completed. To summarize operation of the FIG. 4B driver 30A, during a float condition, all switches are open. During a negate condition, switches S1N, S3N, S2 and S4 are closed. During an assert condition, switches S1A, S3A, S2 and S4 are closed, and currents I2 and I4 are equal to the negation bias current. The logical state dependent error discussed above in connection with the prior art is absent in the FIG. 4B embodiment, resulting in improved signal quality during data transfer.

FIG. 5 shows in graph A an operational signaling sequence beginning with bus idle, bus acquisition (including a hard negation followed by a balanced negation), high speed data sequence, bus release (including a balanced negation followed by a hard negation) and bus idle. FIG. 5 graph B shows that the differential signaling voltage is asymmetric about the zero voltage reference, but FIG. 5 graph C shows that during the high speed data transfer sequence there is no significant common mode voltage disturbance, and that all of the common mode voltage level changes have been forced into the bus acquisition and bus release phases of the signaling sequence. The following table explains the operating conditions of the FIG. 4B driver circuit 30A during the FIG. 5 operational sequence.

TABLE 2

|  | Float negation | Hard negation | balanced negation | assert | negate | assert | negate | hard negation | float negation |
|---|---|---|---|---|---|---|---|---|---|
| I1/I3 | 0ma | −7ma | −7ma | +7ma | −7ma | +7ma | −7ma | −7ma | 0ma |
| I2/I4 | 0ma | 0ma | +2ma | +2ma | +2ma | +2ma | +2ma | 0ma | 0ma |
| Term: | −2ma | −2ma | −2ma | −2ma | −2ma | −2ma | −2ma | −2ma | −2ma |
| bus: | −2ma | −9ma | −7ma | +7ma | −7ma | +7ma | −7ma | −9ma | −2ma |

As shown by the above table, switches S2 and S4 are closed at the beginning of the balanced negation phase during bus acquisition, and opened at the end of the balanced negation phase during bus release. Therefore, the bias negation source/sink pair I2/I4 cancels the negative bias applied by the termination bias generator 18 throughout the high speed data transfer phase, while the main driver source/sink pair I1/I3 provide all of the signaling transitions.

Each current source/sink pair contributes an error current which shows up as a common mode current. The error signal doesn't get cleanly terminated by the differential terminators 16. In the present preferred implementation the error current is applied to the differential bus 10 when the active negation phase is entered during bus acquisition. Since this phase occurs a relatively long time before the actual high speed data transfer begins, any transmission line reflections will die out before high speed data transfers begin. The high speed transitions are typically hundreds or thousands of transitions, instead of the exemplary few shown in FIG. 5. The duration of the hard negation phase needs only to be long enough to obviate any chance of accidental bus assertion (i.e. if I2/I4 are on when I1/I3 are turned off). This timing can be carried out with a clocked delay or with an analog delay line, depending upon a particular implementation. At the end of the transmission during the bus release phase, a reverse sequence is followed in order that the driver 30 leaves the bus 10 cleanly. The current negation source/sink pair I2/I4 is turned off before the signal pair I1/I3 is turned off. This sequence is shown in FIG. 5 graph A as a transition between balanced negation and hard negation during the bus release phase.

Those skilled in the art will appreciate that the driver 30A may be employed in one, some or all of the users 1–4 shown in FIG. 1, and that other drivers may continue to operate in conventional fashion. Thus, the present arrangement is entirely backwardly compatible with existing bus structures, and results in bus operation less susceptible to interference and data corruption than occurred with the prior approach.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. Accordingly, the disclosure and description herein are purely illustrative and are not intended to be in any sense limiting.

What is claimed is:

1. A driver circuit for connection to a differential digital data transmission bus having a weak negation bias current for nominally biasing the bus to a negative data state during bus idle intervals, the driver circuit for overcoming the weak negation bias current during an active signaling sequence and comprising:

a signal current source and sink transistor pair of predetermined size for selectively sourcing and sinking current onto positive and negative lines of the transmission bus in accordance with internally-supplied binary data levels during the active signaling sequence, and a bias override current source and sink transistor pair of predetermined size for applying an override bias current without interruption to the positive and negative lines of the transmission line during the signaling sequence, the bias override current source and sink transistor pair being sized to source and sink bias current in a range of from about one half to about one fifth of the current sourced and sinked by the signal current source and sink transistor pair.

2. The driver circuit set forth in claim 1 wherein the bias override current source and sink pair flow an override current approximately opposite and equal to the weak negation bias current, and wherein the signal current source and sink pair flow substantially all of the signal current applied to the bus during the signaling sequence.

3. A driver circuit for connection to positive and negative lines of a digital differential data transmission bus and including bias override circuitry for overcoming a weak negation bias current of approximately two milliamperes applied to positive and negative lines of the bus during an active signaling sequence, the driver circuit comprising:

a signal current source and sink transistor pair for flowing signal currents in a range of from approximately four to ten milliamperes onto the positive and negative lines of the bus during the active signaling sequence in accordance with internally-supplied binary data levels, and a bias override current source and sink transistor pair for flowing a bias override current of approximately two milliamperes onto the positive and negative lines of the bus oppositely to the weak negation bias current without interruption during the signaling sequence.

4. The driver circuit set forth in claim 1 wherein the signaling sequence includes a bus idle phase, followed by a bus acquisition phase, followed by a high speed data transfer phase, followed by a bus release phase, followed by a bus idle phase.

5. The driver circuit set forth in claim 4 wherein the bus override current source and sink pair apply the override bias current without interruption from the bus acquisition phase to the bus release phase.

6. An interface chip for connection to a differential digital data transmission bus, for overcoming during an active signaling sequence a weak negation bias current applied to bias the bus to a negative data state during bus idle intervals, the chip comprising:

an integrated signal current source and sink pair having a predetermined transistor element sizes, for selectively sourcing and sinking signal current onto positive and negative lines of the transmission bus in accordance with internally-supplied binary data levels during the active signaling sequence, and an integrated bias override current source and sink pair having a predetermined transistor element sizes smaller than the transistor element sizes of the signal current source and sink pair, for applying an override bias current without interruption to the positive and negative lines of the transmission line during the signaling sequence, the transistor elements of the bias override current source and sink pair being so sized within the integrated driver circuit to source and sink bias current in a range of from about one half to about one fifth of the signal current sourced and sinked by the signal current source and sink pair.

7. The interface chip set forth in claim 6 wherein the bias override current provided by the bias override current source and sink pair is approximately two milliamperes flowing oppositely to the weak negation bias, and wherein the signal current source and sink pair flow signal currents in a range of from approximately four to ten milliamperes.

8. A method for operating a bus driver during a signaling sequence, the bus driver being connected to positive and negative lines of a high speed differential digital data transmission bus having a weak negation bias current continuously applied throughout the signaling sequence, the signaling sequence including a bus idle phase, a bus acquisition phase, a high speed data transmission phase, a bus relese phase and a bus idle phase, the method including the steps of:

applying a hard negation current to the bus via a signal current source and sink pair during the acquisition phase and during the release phase, and applying differential switched assert and negate currents during the high speed data transmission phase, and switching on a bias override current source and sink pair to apply an override bias current to the positive and negative lines of the transmission line beginning during the acquisition phase and continuing without interruption to the bus release phase to eliminate common mode current ripple occuring at a data rate of the high speed data transmission phase during the high speed data transmission phase.

9. The driver circuit set forth in claim 1 wherein the differential digital data transmission bus comprises a low voltage differential Small Computing System Interface bus.

10. The driver circuit set forth in claim 3 wherein the differential digital data transmission bus comprises a low voltage differential Small Computing System Interface bus.

11. The method set forth in claim 8 wherein the differential digital data transmission bus comprises a low voltage differential Small Computing System Interface bus.

* * * * *